United States Patent [19]

Imazeki

[11] Patent Number: 4,547,971
[45] Date of Patent: Oct. 22, 1985

[54] TOUCH SENSOR

[75] Inventor: Hiroyuki Imazeki, Mobara, Japan

[73] Assignee: Futaba Denshi Kogyo K.K., Mobara, Japan

[21] Appl. No.: 601,583

[22] Filed: Apr. 18, 1984

[30] Foreign Application Priority Data

Apr. 22, 1983 [JP] Japan .................................. 58-61165

[51] Int. Cl.⁴ ................................................ G01B 5/25
[52] U.S. Cl. .................................. 33/169 R; 33/172 E
[58] Field of Search ............. 33/174 L, 172 E, 169 R; 409/126, 127, 128; 200/61.40

[56] References Cited

U.S. PATENT DOCUMENTS

| | | | |
|---|---|---|---|
| 3,520,063 | 7/1970 | Rethwish et al. | 33/169 R |
| 3,566,479 | 3/1971 | Pascoe et al. | 33/174 L |
| 3,774,310 | 11/1973 | Meier | 33/23 K X |
| 3,991,477 | 11/1976 | Zipin | 33/125 C X |
| 4,270,275 | 6/1981 | McMurtry | 33/174 L |

FOREIGN PATENT DOCUMENTS 1189777  4/1970  United Kingdom ................ 409/127

Primary Examiner—Harry N. Haroian
Attorney, Agent, or Firm—Oblon, Fisher, Spivak, McClelland & Maier

[57] ABSTRACT

A touch sensor is disclosed which is capable of readily and precisely aligning the center of working shaft of a machine tool with that of a measuring element and allowing the distal end of the element to move in a wide range in the three-dimensional directions. The touch sensor includes a plurality of adjusting screws which extend through a casing and are forcedly pressed at one end thereof against a cylinder rotatably receiving a steel ball of the measuring element therein to remove a gap of a micro-distance between the cylinder and the steel ball formed during the assembling to render fine adjustment of the measuring element possible, to thereby precisely carry out the centering of the element.

8 Claims, 8 Drawing Figures

TOUCH SENSOR

BACKGROUND OF THE INVENTION

1. Field of the Invention

This invention relates to a touch sensor, and more particularly to a touch sensor adapted to detect a reference position for working, or a measure initiating and/or terminating position in various machine tools or a three-dimensional measuring device.

2. Description of the Prior Art

For example, when the working is to be carried out by means of a machine tool, it is highly essential to precisely determine a reference position for measuring the working position.

The setting of such a reference position has been conventionally carried out by means of a touch sensor, for example, in such a manner as shown in FIG. 1, wherein a touch sensor 2 is mounted on a working shaft 1 of a machine tool instead of a tool. The operation of a handlewheel 5 allows an object to be measured fixedly carried on a movable table 4 to abut at the end face thereof against a measuring element of the touch sensor 2, and the abutment therebetween is electrically detected and read out by a scale 6 mounted on the table 4.

Also in a measuring system, the detection of measure initiating and/or terminating positions is likewise carried out. More particularly, a touch sensor is mounted on a measuring head to electrically detect the contact between various measuring positions and the touch sensor so that the position may be read out.

There have been used many touch sensors of various constructions in such a measuring system. FIG. 2 shows a basic structure of a conventional touch sensor typically used in a measuring system for the reason that a measuring element returns to a reference position with a good repeatability.

The conventional touch sensor shown in FIG. 2 is constructed in such a manner that a measuring element 8 having a contact 8a formed at one end thereof which is adapted to abut against an object to be measured and a flange 8b formed at the other end thereof has three pin members 9 radially horizontally projected from the flange 8b, and the pin members 9 are respectively supported in three V-shaped supporting means 10 embedded in a housing. The flange 8b is constantly forced against the supporting means 10 by a spring 12 interposed between a spring bearing 11 of a pivotal mechanism and the flange 8b so that the measuring element 8 is mechanically located at a stable position of one point. In this instance, the supporting means 10 and pin 9 of each set can be deemed to form a contact mechanism together because the three supporting means 10 are deemed to be short-circuited together by the pins 9. Thus, the supporting means are connected with each other by means of wirings 13.

In the prior art touch sensor constructed as described above, when the contact 8a is abutted against an object to be measured, any one of the pins 9 is caused to separate from the corresponding supporting means 10 to open its electric circuit so that the contact between the contact 8a and an object to be measured may be detected.

However, the application of such a mechanism for supporting a measuring element as shown in FIG. 2 to a touch sensor used to set a reference position of a machine tool or the like causes the following problem.

The working operation of a machine tool is carried out after a touch sensor is mounted on a working shaft of the machine tool instead of a tool to carry out the setting of a reference position and then the touch sensor is removed from the shaft to attach the tool to the shaft.

Thus, it is essential to precisely align the center of the working shaft with that of the contact formed at the distal end of a measuring element or carry out the centering of the measuring element.

However, although the mechanism shown in FIG. 2 allows the measuring element to return to a reference position with a good repeatability, it does not include any means for aligning the center of the working shaft with that of the measuring element. Thus, it is highly difficult to carry out the centering.

SUMMARY OF THE INVENTION

The present invention has been made in view of the foregoing disadvantage of the prior art.

Accordingly, it is an object of the present invention to provide a touch sensor which is capable of readily and precisely aligning the center of a working shaft of a machine tool or the like with the center of a measuring element of the touch sensor as well as allowing the measuring element to return to a reference position with a good repeatability.

It is another object of the present invention to provide a touch sensor which is capable of allowing the distal end of a measuring element to move in a wide range in the three-dimensional directions to permit the touch sensor to be applied to a three-dimensional measuring device as well.

In accordance with the present invention, there is provided a touch sensor comprising a measuring element having a contact which is adapted to abut against an object to be measured, a flange and a steel ball formed at one end, the other end and the intermediate portion thereof, respectively; a casing formed integral with a shank adapted to be mounted with respect to a machine tool or the like; a base plate arranged in said casing and through which said measuring element swingably extends; a supporting means comprising at least three projections provided on said base plate to support said flange of said measuring element thereon; an elastic member for biasing said flange of said measuring element toward said supporting means; a cylinder provided in said casing to support therein said steel ball of said measuring element in a manner to allow said steel ball to freely roll in said cylinder; and a plurality of adjusting screws extending through said casing and forcedly pressing at the distal end thereof against the outer periphery of said cylinder.

BRIEF DESCRIPTION OF THE DRAWINGS

Other objects and many of the attendant advantages of the present invention will be readily appreciated as the same becomes better understood by reference to the following detailed description when considered in connection with the accompanying drawings, wherein:

FIG. 1 is a schematic view showing the mounting of a touch sensor on a machine tool or the like;

DETAILED DESCRIPTION OF THE PREFERRED EMBODIMENT

Now, a touch sensor according to the present invention will be described hereinafter with reference to the accompanying drawings.

Figure 1:
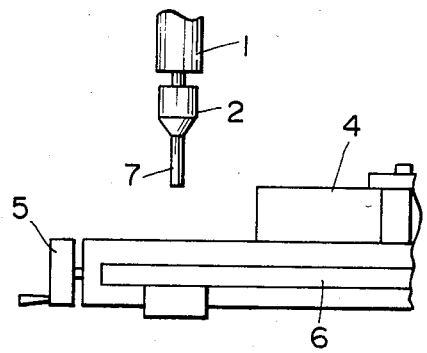
Figure 2:
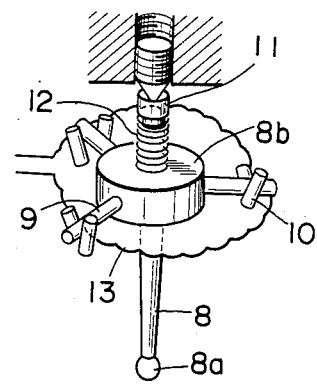
FIG. 2 is a schematic view illustrating the basis structure of a typical example of a prior art touch sensor.
Figure 4:
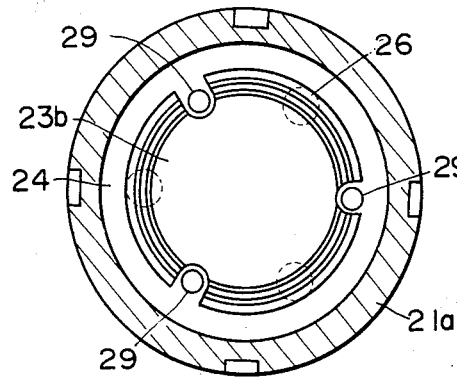
FIG. 4 is a sectional view taken along the line IV—IV of FIG. 3.
Figure 5:
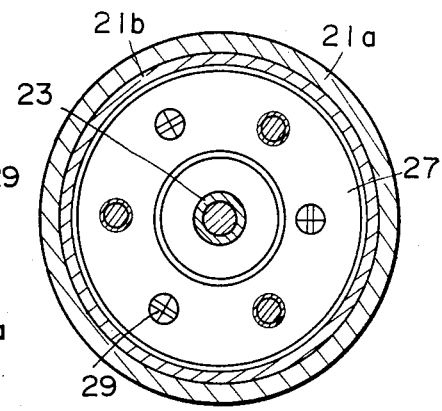
FIG. 5 is a sectional view taken along the line V—V of FIG. 3.
Figure 3:
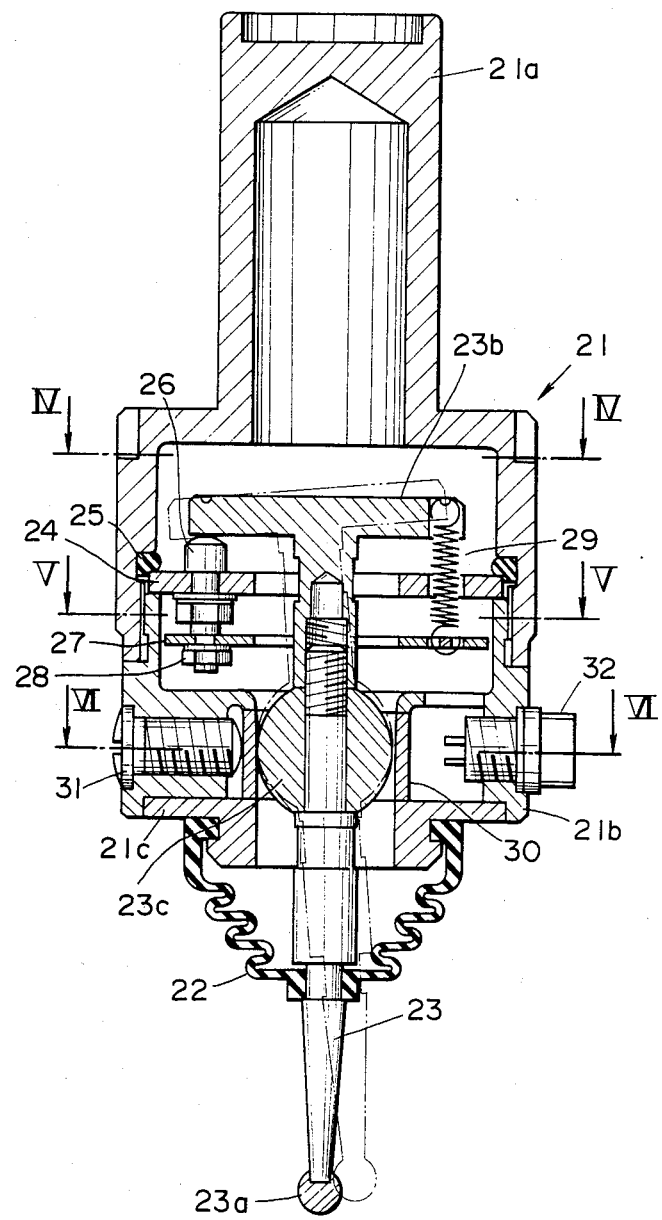
FIG. 3 is a vertical section view showing an embodiment of a touch sensor according to the present invention.
Figure 6:
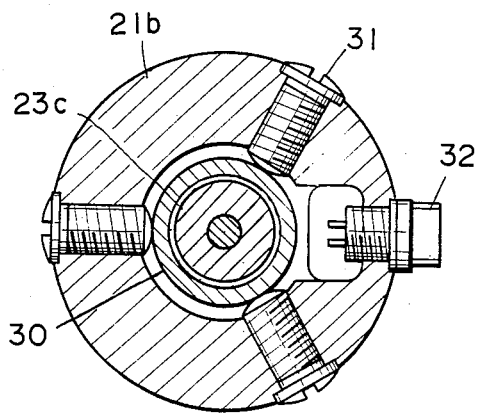
FIG. 6 is a sectional view taken along the line VI—VI of FIG. 3 prior to deformation of the cylindrical element 30 by the adjusting screws 31.

FIG. 3 is a vertical sectional view showing an embodiment of a touch sensor according to the present invention, and FIGS. 4 to 6 are cross sectional views taken along the lines IV—IV, V—V and VI—VI of FIG. 3, respectively.

A touch sensor of the illustrated embodiment includes a casing 21 for receiving a measuring element or the like therein. In the embodiment, the casing 21 is divided into three pieces or an upper casing member 21a also acting as a shank, an intermediate casing member 21b and a lower casing member 21c. On the lower casing member 21c is fitted a dusttight case 22 made of a flexible material to provide the casing 21 with sealing performance. The touch sensor also includes a measuring element 23 received in the casing 21, which is formed at the lower end thereof outwardly extending from the casing 21 with a contact 23a which is adapted to abut against an object to be measured. The measuring element 23 is integrally formed at the upper end thereof with a flange 23b.

The measuring element 23 also has a steel ball 23c fitted on the intermediate portion thereof, which is preferably made of, for example, bearing steel or stainless steel. In the casing 21 is also received a base plate 24, which is horizontally interposed between the upper casing member 21a also acting as the shank and the intermediate casing member 21b through an O-ring 25 or the like. The base plate 24 has three bolt members 26 arranged thereon, which serve as a supporting means for defining a reference position of the measuring element 23. The measuring element 23 is supported at the lower surface of the flange 23b on the bolt members 26.

The base plate 24 is preferably arranged to have a surface perpendicular to the shank 21a. However, even when the base plate 24 is disposed to cause the surface thereof to be somewhat deflected from the orthogonal relationship to the shank 21a, the touch sensor is not substantially hindered from such deflection, because it can be readily compensated by the adjusting operation utilizing an adjusting screws after the assembling, which will be described hereinafter. In addition, the heights between the upper surface of the base plate 24 and the respective bolt members 26 during the assembling are not required to be just the same as each other, because the fine adjustment is carried out by the adjusting operation.

The embodiment may be constructed in a manner such that a contact mechanism is made up of the flange 23b and the bolt members 26 to obtain a contact detecting signal by detecting the contact between the contact 23a provided at the lower end of the measuring element 23 and an object to be measured due to separation of the flange 23b from any of the bolt members 26. In this instance, the base plate 24 is made of an insulating material such as glass or the like.

Reference numeral 27 designates a circuit board fixed on the bolt members 26 at the position in proximity to the lower end thereof by means of nuts 28. When a contact detecting signal is obtained by detecting separation of the flange 23b from any of the bolt members 26, a detecting circuit for this purpose is provided on the circuit board 27.

The touch sensor also includes an elastic member 29 stretched between the flange 23b and the circuit board 27 to constantly bias the flange 23b toward the bolt members 26. In the illustrated embodiment, the elastic member 29 is arranged to extend through the base plate 24 between the flange 23b and the circuit board 27 for the purpose of compacting the touch sensor. Such a construction has an advantage that the measuring element 23 can return to the reference position with a good repeatability and uniform displacement force can be generated with respect to all the displacement directions of the measuring element, because it allows the elastic member 29 to effectively prevent rotation of the flange 23b.

The touch sensor further includes a cylinder means 30 which forms a part of the essential features of the present invention. The cylindrical element 30 is arranged to be interposed between the intermediate case member 21b and the lower case member 21c to rotatably support the steel ball 23c therein and is made of bearing steel, stainless steel, tool steel or the like as in the steel ball 23c.

It is essential to prevent the formation of a gap between the cylindrical element 30 and the steel ball 23c in the finished touch sensor in order to ensure that the measuring element 23 returns to a reference position with a good repeatability. However, during the assembling, a gap of a micro-distance as small as several to several ten microns is provided between the cylinder 30 and the steel ball 23c to carry out the snug fit therebetween for the purpose of facilitating the assembling operation and the operation of positionally aligning the center of the shank 21a with that of the contact 23a. Such gap is eliminated from the finished touch sensor by extending a plurality of adjusting screws 31 through the intermediate casing member 21b and forcedly pressing the distal ends of the screws 31 against the cylinder 30 to deform it as shown in FIG. 6. In the illustrated embodiment, the number of adjusting screws 31 used is three.

Reference numeral 32 shown in FIGS. 3 and 6 designates a connector for supplying a contact detecting signal generated in the circuit board 27 to the exterior.

Figure 8:
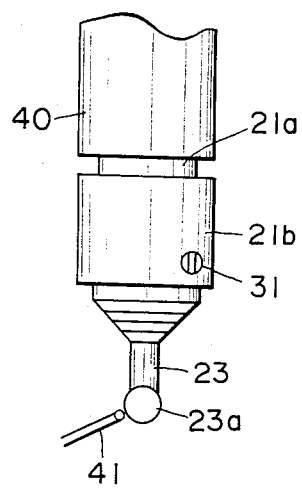
FIG. 8 is a side view showing the adjustment operation.

The touch sensor of the illustrated embodiment constructed as described above is applied to a machine tool or the like by mounting the shank 21a on a working shaft 40 of the machine tool and then a contact element 41 of a measuring device such as a dial gauge, an electric micrometer or the like is arranged to abut against the contact 23a of the measuring element 23 as shown in FIG. 8.

Figure 7:
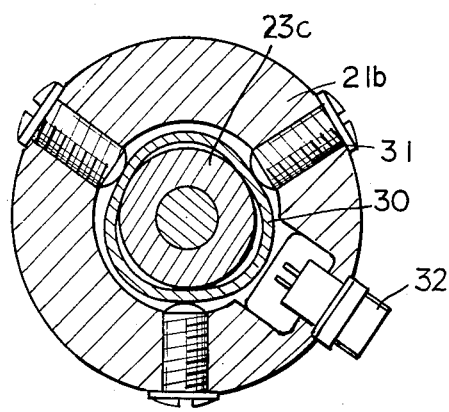
FIG. 7 is a sectional view taken along the line VI—VI of FIG. 3 after deformation of the cylindrical element 30 by the adjusting screws 31.

The touch sensor first detects the deflection of the contact 23a occurring when the main shaft 40 is being rotated. Then, the touch sensor is subjected to the adjusting operation, which is accomplished by fastening or loosening the three adjusting screws 31 to remove the deflection and the gap between the cylinder 30 and the steel ball 23c as shown in FIG. 7, as well as align the center of the shank 21a with the center of the contact 23a.

The adjusting operation described above allows the center of the shank 21a to align with that of the contact 23a of the measuring element 23, and the centering is completed. Thereafter, the contact 23a is abutted against an object from any of the X, Y and Z directions to roll the steel ball 23c in the cylinder 30, so that the flange 23b may be inclined against the tension of the elastic member 29 as shown by two-dot chain lines in FIG. 3 to separate the flange 23b from any of the bolt members 26. The separation allows a contact detecting signal to be generated in the circuit board 27, which is then supplied through the connector 32 to a control section (not shown) of the machine tool to carry out the setting of the reference position.

When the contact between the contact 23a of the measuring element 23 and an object to be measured is released, the measuring element 23 returns to the original position shown by solid lines in FIG. 3 due to the tension of the elastic member 29.

In this instance, any gap does not exist between the steel ball 23c and the cylinder 30 acting as a bearing for the steel ball 23c any longer, resulting in the measuring element 23 accurately returning to the original position.

Also, the steel ball 23c formed at the intermediate portion of the measuring element 23 is supported by the cylinder 30 so as to freely roll therein. Thus, the measuring element 23 can be smoothly moved in any of the X, Y and Z directions and the movement is carried out in a wide range.

In the embodiment described above, a tension spring is used as the elastic member 29 stretched between the flange 23b and the circuit board 27 to bias the flange 23b toward the bolt members 26. However, when the touch sensor is not of the type that the circuit board is included in the casing, the application of biasing force to the flange 23b may be carried out by means of a compression spring interposed between the upper surface of the flange 23b and the inner surface of the upper casing member acting as the shank 21a. Also, in order to facilitate the fitting of the steel ball 23c in the cylinder 30 in the assembling operation, the cylinder 30 may be formed with a cutout along the axial direction thereof. The touch sensor of the present invention is particularly effectively used for setting the reference position of a machine tool or the like. However, it is not limited to such applications, and is widely used as a touch sensor for a three-dimensional measuring device as well.

As described hereinbefore, in the touch sensor according to the present invention, the steel ball is formed at the intermediate portion of the measuring element which has the contact formed at one end thereof and adapted to abut against an object to be measured and is fitted in the cylinder provided in the casing with a gap of a micro-distance being interposed between the cylinder and the steel ball. Also, a plurality of the adjusting screws are arranged in the manner to extend through the casing and abut at the distal end thereof against the outer pheripheral surface of the cylinder. Further, the base plate is arranged in the casing which has the upper surface cross the outer side surface of the shank formed integral with the casing and through which the shaft portion of the measuring element extends. Furthermore, the base plate is provided with a plurality of the supporting members extending from the upper surface thereof which act to support thereon the flange formed at the other end of the measuring element, the flange being constantly biased toward the supporting members by means of the elastic member.

Thus, it will be noted that the present invention has an advantage that the adjusting screws effectively remove the gap of a micro-distance between the cylinder and the steel ball formed during the assembling to render the fine adjustment of center of the measuring element possible, to thereby readily and precisely align the center of the shank and more specifically a main shaft of a machine tool with the center of the measuring element.

Also, the present invention has another advantage that the measuring element is smoothly moved in any of the X, Y and Z directions in a wide range because the steel base is supported in the cylinder so as to freely roll therein.

As many apparently widely different embodiments of this invention may be made without departing from the spirit and scope thereof, it is to be understood that the invention is not limited to the specific embodiment thereof except as defined in the appended claims.

What is claimed as new and desired to be secured by letters patent of the United States is:

1. A touch sensor comprising:
   (a) a casing including a shank adapted to be mounted on a machine tool or the like;
   (b) a generally linear measuring element having a contact which is adapted to abut against an object to be measured at one end, a flange at the opposite end, and a ball bearing formed about an intermediate portion thereof, the flange and the ball bearing being disposed inside said casing and the contact protruding from said casing;
   (c) a base plate mounted in said casing at least generally perpendicularly to the at rest position of said generally linear measuring element, said measuring element extending through said base plate such that the flange of said measuring element is on one side of said base plate and the contact of said measuring element is on the other side of said base plate;
   (d) supporting means comprising at least three symmetrically positioned projections provided on said base plate to support the flange of said measuring element when said measuring element is in its at rest position;
   (e) at least one elastic means for biasing the flange of said measuring element towards contact with said at least three symmetrically positioned projections;
   (f) a cylindrical bearing disposed in said casing in position to journal the ball bearing formed on said measuring element for both linear and pivotal movement, said cylindrical bearing and the ball bearing on said measuring element having dimensions which initially provide clearance therebetween; and
   (g) at least three symmetrically positioned adjusting screws threadedly mounted in said casing and bearing against the external surface of said cylindrical bearing, whereby said at least three symmetrically positioned adjusting screws can be used to deform said cylindrical bearing into contact with the ball bearing on said measuring element.

2. A touch sensor as recited in claim 1 wherein the ball bearing on said measuring element is made of bearing steel.

3. A touch sensor as recited in claim 1 wherein said base plate is made of an insulating material.

4. A touch sensor as recited in claim 1 wherein a plurality of symmetrically disposed elastic means bias the flange of the measuring element towards contact with said at least three symmetrically positioned projections.

5. A touch sensor as recited in claim 4 wherein at least three symmetrically disposed elastic means bias the flange of the measuring element towards contact with said at least three symmetrically positioned projections.

6. A touch sensor as recited in claim 1 wherein said cylinder is made of bearing steel.

7. A touch sensor as recited in claim 1 wherein the axial positions of said at least three symmetrically positioned projections on said base plate are adjustable.

8. A touch sensor as recited in claim 1 and further comprising means for generating a detecting signal when motion of the contact on said measuring element causes at least one of said at least three symmetrically positioned projections on said base plate to break contact with the flange on said measuring element.

* * * * *